(12) United States Patent
Zahasky

(10) Patent No.: US 11,214,384 B2
(45) Date of Patent: Jan. 4, 2022

(54) HEXAGONAL FLOOR AND CEILING SYSTEM FOR A VEHICLE

(71) Applicant: Textron Innovations Inc., Providence, RI (US)

(72) Inventor: Andrew Zahasky, North Richland Hills, TX (US)

(73) Assignee: TEXTRON INNOVATIONS, INC., Providence, RI (US)

( * ) Notice: Subject to any disclaimer, the term of this patent is extended or adjusted under 35 U.S.C. 154(b) by 189 days.

(21) Appl. No.: 15/913,666

(22) Filed: Mar. 6, 2018

(65) Prior Publication Data

US 2018/0251206 A1    Sep. 6, 2018

Related U.S. Application Data

(60) Provisional application No. 62/467,680, filed on Mar. 6, 2017.

(51) Int. Cl.
*B64C 1/18* (2006.01)
*B64D 43/00* (2006.01)
(Continued)

(52) U.S. Cl.
CPC .............. *B64D 43/00* (2013.01); *A42B 3/042* (2013.01); *A42B 3/0433* (2013.01); *A42B 3/228* (2013.01); *A42B 3/30* (2013.01); *B64C 1/066* (2013.01); *B64C 1/18* (2013.01); *B64C 1/40* (2013.01); *B64C 13/042* (2018.01); *B64C 13/044* (2018.01); *B64C 13/18* (2013.01); *B64C 13/22* (2013.01); *B64D 11/0626* (2014.12); *B64D 11/0647* (2014.12); *B64D 11/0689* (2013.01); *G01C 23/00* (2013.01);

*G01C 23/005* (2013.01); *G02B 27/017* (2013.01); *G06F 3/012* (2013.01); *G06F 3/017* (2013.01); *G06T 19/006* (2013.01); *G08G 5/0004* (2013.01);
(Continued)

(58) Field of Classification Search
CPC ......... B64C 1/18; B64C 1/20; B64C 2211/00; B64D 11/0696; B64D 11/0626; B64D 11/0015
USPC ...... 248/346.01, 6, 188.1, 0.2; 297/232, 257
See application file for complete search history.

(56) References Cited

U.S. PATENT DOCUMENTS 4,872,625 A * 10/1989 Filley ....................... B64G 1/12
244/159.4
5,205,091 A * 4/1993 Brown ................... E04F 15/024
52/126.6
(Continued)

*Primary Examiner* — Timothy D Collins
*Assistant Examiner* — Terri L Filosi
(74) *Attorney, Agent, or Firm* — Whitaker Chalk Swindle & Schwartz PLLC; Enrique Sanchez, Jr.

(57) ABSTRACT

The present invention achieves technical advantages as a vehicle cabin, comprising a floor system formed of removable and reconfigurable floor segments extending from a vehicle frame, and a ceiling system formed of removable and reconfigurable ceiling segments disposed in the ceiling of the vehicle cabin. Floor segments that can be positioned to form a floor channel, therebetween. A fixture interface adapted to releasably secure a fixture to the floor system. The fixture can be slidably repositioned within the vehicle along the floor channel. One of the ceiling segments includes one or more of a lighting module, a ventilation outlet, a ventilation inlet, a display screen, or a touch control panel. The ceiling segments can be hexagonal.

5 Claims, 12 Drawing Sheets

(51) Int. Cl.

| | | |
|---|---|---|
| *A42B 3/30* | (2006.01) | |
| *G06F 3/01* | (2006.01) | |
| *G01C 23/00* | (2006.01) | |
| *G08G 5/00* | (2006.01) | |
| *B64C 13/18* | (2006.01) | |
| *B64C 13/22* | (2006.01) | |
| *A42B 3/04* | (2006.01) | |
| *A42B 3/22* | (2006.01) | |
| *G06T 19/00* | (2011.01) | |
| *G02B 27/01* | (2006.01) | |
| *B64D 11/06* | (2006.01) | |
| *B64C 13/04* | (2006.01) | |
| *B64C 1/06* | (2006.01) | |
| *B64C 1/40* | (2006.01) | |
| *G06F 3/044* | (2006.01) | |
| *B64C 13/10* | (2006.01) | |
| *B64D 11/00* | (2006.01) | |

(52) U.S. Cl.
CPC ......... *G08G 5/0017* (2013.01); *G08G 5/0021* (2013.01); *G08G 5/0039* (2013.01); *G08G 5/0047* (2013.01); *G08G 5/0091* (2013.01); *B64C 13/10* (2013.01); *B64D 11/0015* (2013.01); *B64D 11/0641* (2014.12); *B64D 11/0646* (2014.12); *B64D 2011/0046* (2013.01); *G06F 3/044* (2013.01)

(56) References Cited

U.S. PATENT DOCUMENTS

| | | | | |
|---|---|---|---|---|
| 2001/0034987 | A1* | 11/2001 | Cooper | E04F 15/02458 52/220.8 |
| 2005/0128751 | A1* | 6/2005 | Roberge | F21K 9/00 362/276 |
| 2005/0164535 | A1* | 7/2005 | Isaacks | H01R 13/6397 439/133 |
| 2005/0201087 | A1* | 9/2005 | Ward | G02B 6/0078 362/223 |
| 2010/0314495 | A1* | 12/2010 | Dazet | B60P 7/0815 244/131 |
| 2016/0178326 | A1* | 6/2016 | Strauss | F41H 5/04 89/36.02 |

\* cited by examiner

HEXAGONAL FLOOR AND CEILING SYSTEM FOR A VEHICLE

BACKGROUND OF THE INVENTION

1. Field of the Invention

The present invention generally relates to vehicles and more particularly to aircraft with modular assembly with alterable segments and specialized, adaptable passenger seating configurations.

2. Background of the Invention

Conventional vehicles are characterized by fixed fixtures, such as seating, consoles, etc., which limit occupants' ability to customize the environment to their needs. The static positioning of these fixtures also leaves controls in the way of passengers when they are no longer needed. As vehicles are by their nature mobile, fixtures inside of the vehicle must be secured such that no harm will come to passengers of articles located in the cabin of a vehicle.

Traditional vehicles contain rail systems that are secured to the frame of a vehicle, which allow back and forth movement of a fixture within a limited length of a rail. Such systems are linear and can be difficult to manipulate. Removal of fixtures in a rail system is exceedingly difficult, often requiring power tools or specialized tools. Additional systems require bolting of the fixtures to predetermined locations within a vehicle cabin. Such removal and repositioning is time consuming and still suffers severe constraints on the customization of the fixtures to meet the needs of the occupants. When vehicles are aircraft, turbulence requires much more stringent securing mechanisms to maintain fixtures in place.

There is thus a need for a vehicle cabin that lacks these disadvantages so that an occupant has greater control of his or her environment to achieve his or her needs.

SUMMARY OF THE INVENTION

Accordingly there is disclosed a vehicle cabin, comprising a floor system formed of removable and reconfigurable floor segments extending from a vehicle frame, and a ceiling system formed of removable and reconfigurable ceiling segments disposed in the ceiling of the vehicle cabin.

In other aspects, the invention includes:

Floor segments that can be positioned to form a floor channel, therebetween. A fixture interface adapted to releasably secure a fixture to the floor system. The fixture can be slidably repositioned within the vehicle along the floor channel. One of the ceiling segments includes one or more of a lighting module, a ventilation outlet, a ventilation inlet, a display screen, or a touch control panel. The ceiling segments can be hexagonal.

A vehicle floor system includes a hexagonal floor puck having a flange circumscribing the perimeter of the floor puck. A hexagonal puck support structure can be adapted to receive the floor puck. A plurality of struts extend downwardly from the puck support structure, the plurality of struts secured to a vehicle frame such that the puck support structure is elevated above the vehicle frame. Wherein a plurality of the puck support structures can be disposed on the vehicle frame such that a channel is created between a first puck support structure and a second puck support structure proximate the first puck support structure.

The vehicle floor system includes a top side of the floor puck can include a non-slip coating. A power rail can be disposed on the puck support structure. The vehicle floor system further comprises a fixture interface adapted to engage the channel created between the first and second puck support structures. The fixture interface can include a support member and retaining member. The support member can be attached to a seat. The support member can also be attached to a table. The retaining member can include a power interface. The retaining member can rotatably engage the puck support structure to releasably secure the fixture interface to the puck support structure.

A vehicle ceiling system includes a hexagonal ceiling module. A hexagonal module support structure can be adapted to receive a plurality of ceiling modules. A plurality of struts can extend upwardly from the module support structure, the plurality of struts secured to a vehicle frame such that the module support structure is elevated away from the vehicle frame. The ceiling module can include one or more of a lighting module, a ventilation outlet, a ventilation inlet, a display screen, or a touch control panel. The ceiling module can be slidably coupled to the module support structure. The ceiling modules can also be removable and reconfigurable. The vehicle ceiling system can also include a plurality of sound isolating ceiling pucks. The ceiling module can include a ventilation outlet and a control panel.

Other embodiments in accordance with the spirit and scope of the invention will become apparent to those of skill in the art.

DETAILED DESCRIPTION OF THE INVENTION

Described herein is an embodiment of a vehicle cabin that advances the state of the art in several significant functional aspects. A floor system formed of removable and reconfigurable floor segments extending from a vehicle frame, and a ceiling system formed of removable and reconfigurable ceiling segments disposed in the ceiling of the vehicle cabin replaces the traditional—and usually fixed—cabin interior. Embodiments disclosed herein are applicable to all vehicle cabins, including, but not limited to, aircraft, automobiles, trains, ships, and all other mobile environments having occupants.

The preferred version of the invention presented in the following written description and the various features and advantageous details thereof are explained more fully with reference to the non-limiting examples included in the accompanying drawings and as detailed in the description which follows. Descriptions of well-known components and processes and manufacturing techniques are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 1:
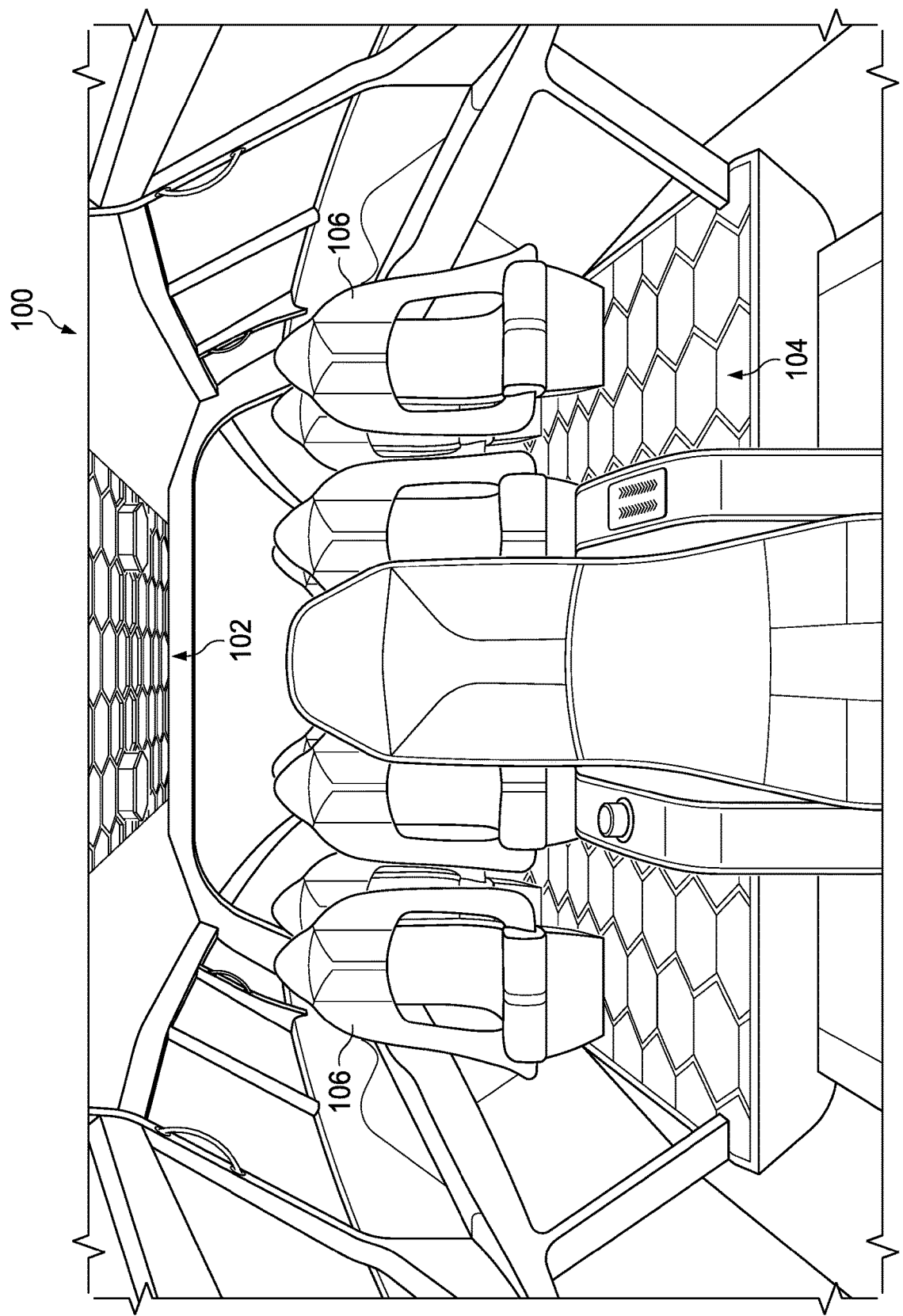
FIG. 1 illustrates a rearward view of a vehicle cabin and structural features of the floor and ceiling, in accordance with one embodiment of the present invention.

FIG. 1 illustrates a rearward view of a vehicle cabin and structural features of the floor and ceiling, in accordance with one embodiment of the present invention. A vehicle cabin 100, includes a ceiling system 102 and a floor system 104. A locking seat support member for a seat 106 can be slidably secured between hexagonal floor panels of the floor system 104. Also shown is one embodiment of a ceiling system 102, which can be formed as an array of hexagonal panels wherein each hexagonal panel can be detachably connected to the cabin ceiling such that passive hexagonal panels may be replaced with active hexagonal panels configured to provide lighting or ventilation openings for the cabin interior and may include supplemental display screens or touch control panels for use by the passengers. The floor system 104 may also be formed as an array of hexagonal panels to cover and enable access to storage facilities, including fuel storage facilities selected from the group consisting of tanks for liquid fuel and gas fuel, fuel cell modules, and batteries.

Advantageously the hexagonal shape of the floor panels provides a channel wherein passenger seats 106 can be positioned within the passenger cabin by sliding the seating supports along the hexagonal channel and locking them into place once in the desired position. Conference tables, communication panels, power modules, and other objects needing to be secured during flight may be outfitted with the hexagonal channel support and lock system. Optionally, seating may be rotated about the seat support, such that two seats can face each other, or a conference table may be provided, such that seats face the conference table on all sides.

Figure 2:
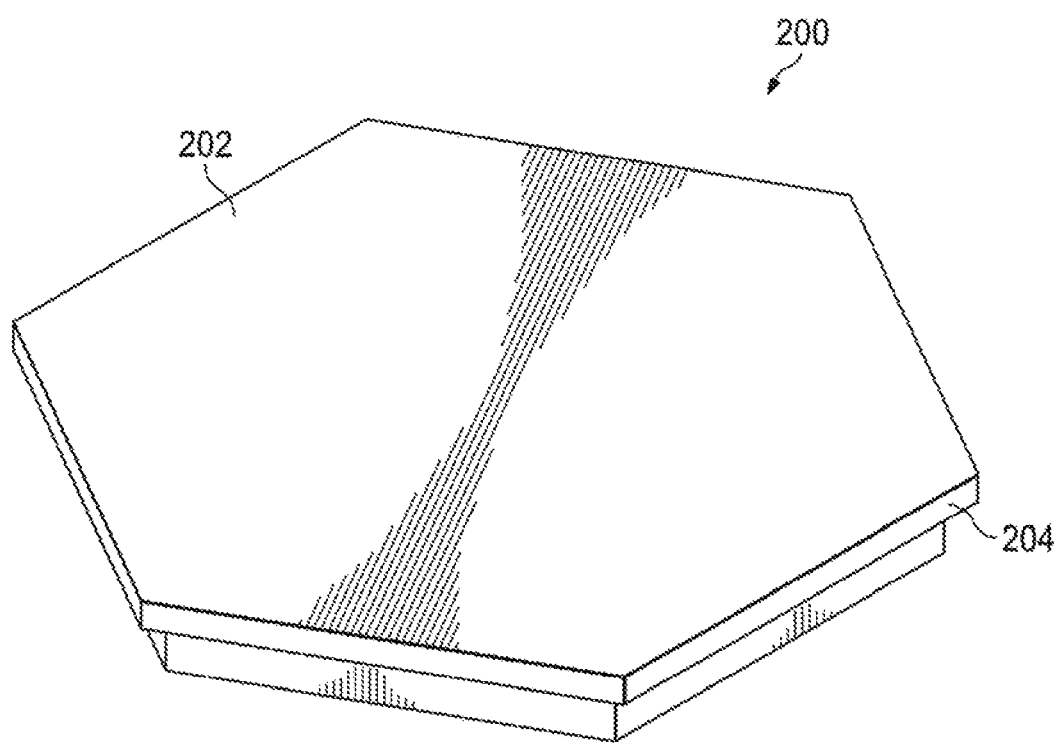
FIG. 2 illustrates a perspective view of a floor puck, in accordance with one embodiment of the present invention.

FIG. 2 illustrates a perspective view of a floor puck 200, in accordance with one embodiment of the present invention. Hexagonal floor puck 200 includes a top layer 202 and a flange 204. Alternatively, the floor puck 200 can have a first flange flush with the top layer 202 and a second flange below the first flange and extending further from the puck 200 than the first flange, such that a trench is formed between the first flange and the second flange, circumscribing the floor puck 200. If two dual-flanged floor pucks are laid proximate each other, the longer second flanges would touch and the shorter first flanges would leave an opening therebetween. Hexagonal floor puck 200 can be made of metal, plastic, or other suitable material. Although, preferably hexagonal in shape, floor puck 200, can be circular, rectangular, or other suitable and/or desired shape. The floor puck 200, includes a top layer 202, which can include a non-slip coating, protective coating, or carpeting.

Figure 3:
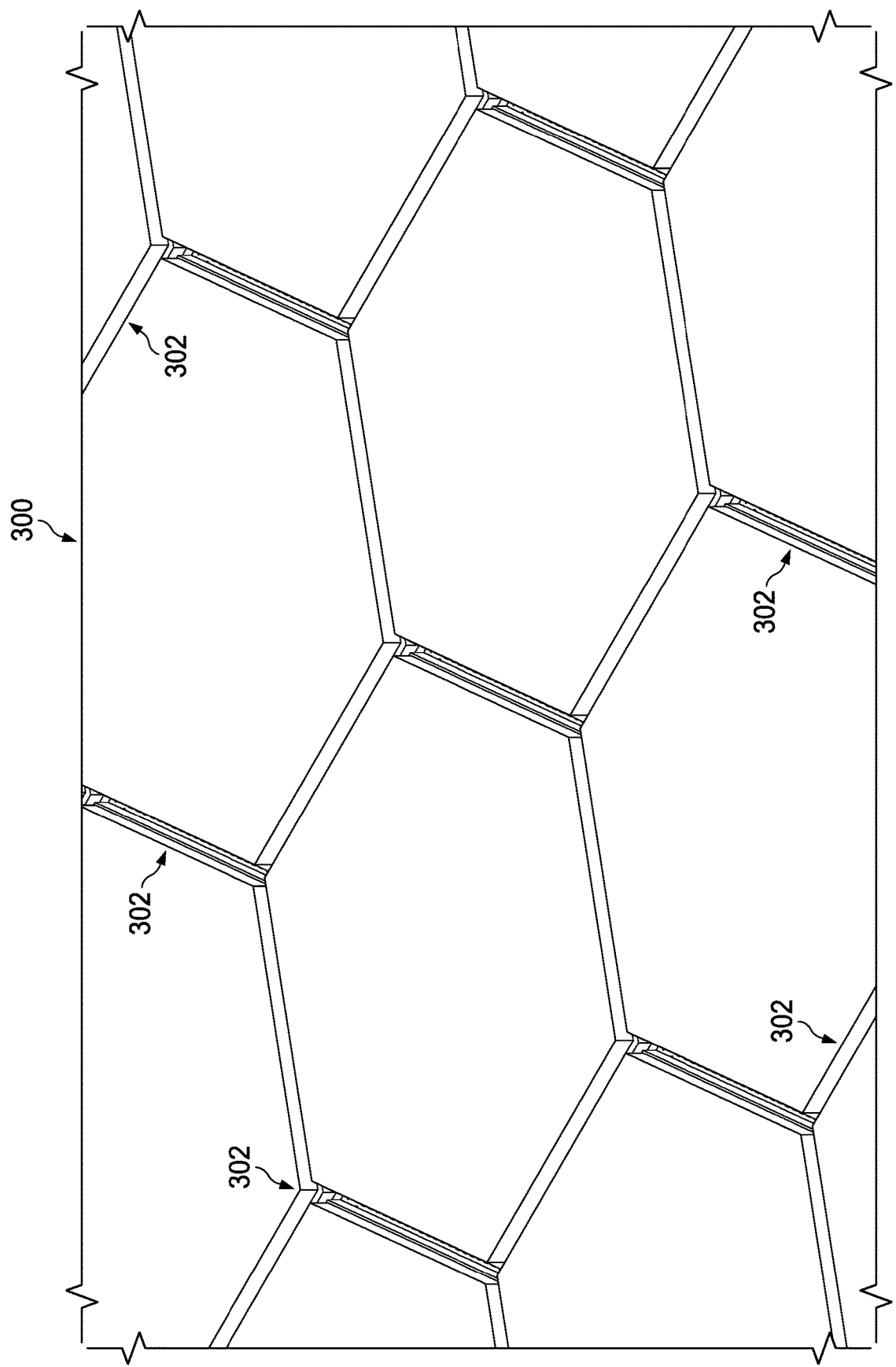
FIG. 3 illustrates a perspective view of a floor system, in accordance with one embodiment of the present invention.

FIG. 3 illustrates a perspective view of a floor system, in accordance with one embodiment of the present invention. A plurality of floor pucks 200 can be positioned in a honeycomb arrangement on the floor of the vehicles cabin. Such floor pucks 200 are positioned such that a channel 302 is created between a first floor puck and a second floor puck proximate the first floor puck. In one exemplary embodiment, bristles can be disposed onto the outer edges of the floor puck 200 to prevent objects from falling into the channel 302, yet still allow for objects to be slid along the channel 302. A plurality of channels 302 are created around each of the floor pucks 200.

Figure 4:
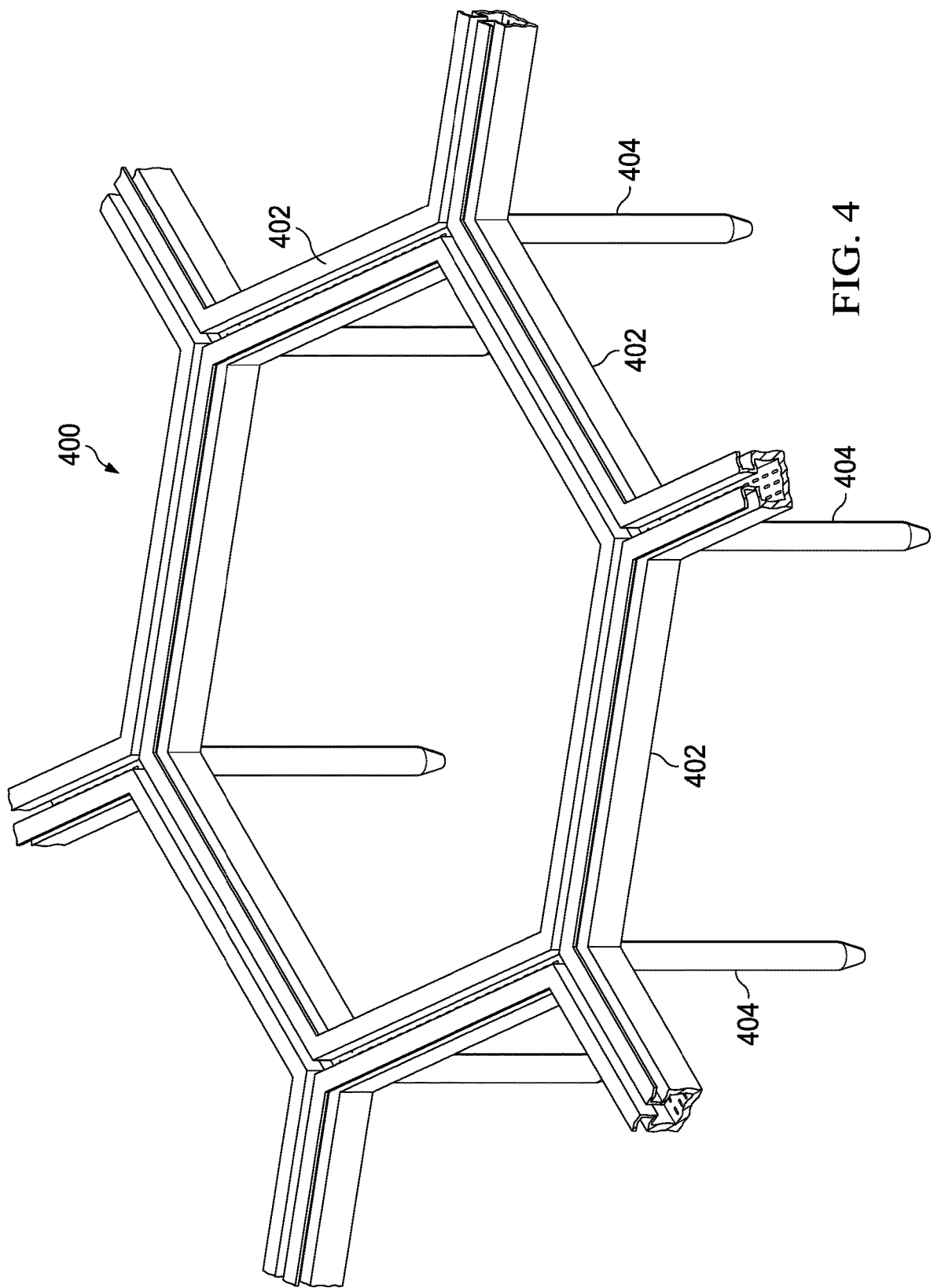
FIG. 4 illustrates a perspective view of a module support structure, in accordance with one embodiment of the present invention.

FIG. 4 illustrates a perspective view of a module support structure, in accordance with one embodiment of the present invention. A module support structure 400 can include a continuous structural mesh of hexagonal members 402 adapted to receive a hexagonal puck, with noise-dampening or noise-cancelling characteristics. In other embodiments the continuous structural mesh members 402 and the pucks can be rectangular, circular, or other suitable shape. The module support structure is preferably made of metal, but can alternatively be made of plastic or other suitable material. The module support structure 400 is sized to receive a plurality of ceiling modules, such as light fixtures, air vents, displays and controls.

A plurality of struts 404 extend from one side of the intersections of the structural mesh members 402. The struts 404 are preferably made of metal, but can alternatively be made of plastic or other suitable material. The struts 404 are attached to the frame of the vehicle, such that the module support structure 400 is rigidly secured to the ceiling of the vehicle cabin. The module support structure 400 can retain heavy components in-place without damage to the module support structure 400, withstanding turbulence of various kinds.

Figure 5:
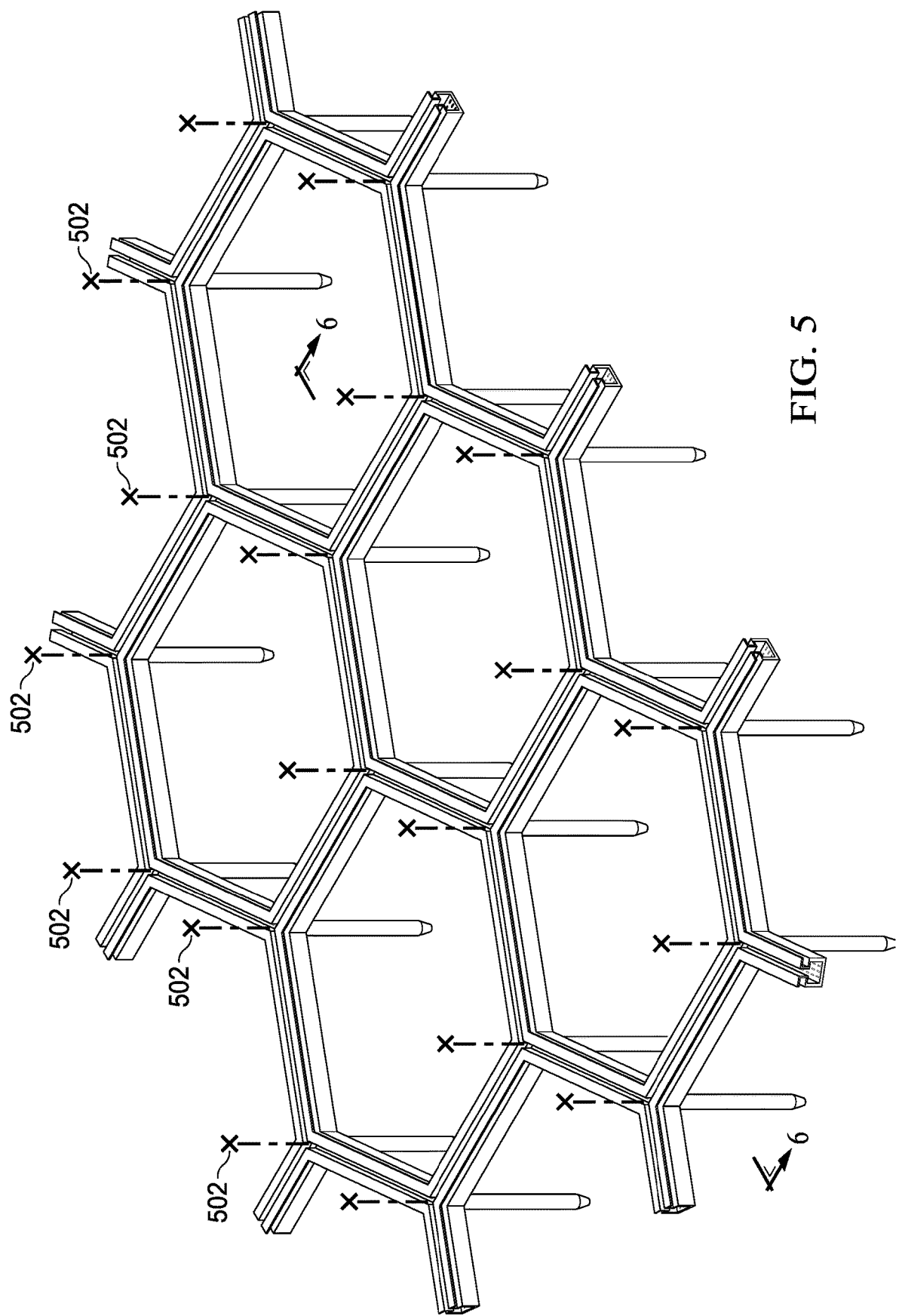
FIG. 5 illustrates a perspective view of one embodiment of the points of attachment for the module support structure of FIG. 4.

FIG. 5 illustrates a perspective view of one embodiment of the points of attachment for the module support structure of FIG. 4. In order to facilitate the strongest retention of the module support structure to the vehicle frame, struts 404 are located at each intersection 502 and secured to the vehicle frame. Alternatively, struts may be disposed on alternating intersections of the module support structure 400. The struts 404 are preferably disposed onto the vehicle frame and the module support structure 400 via weld. Alternatively, the struts can be disposed onto the vehicle frame and the module support structure 400 via bolting or other suitable mechanism.

Figure 6:
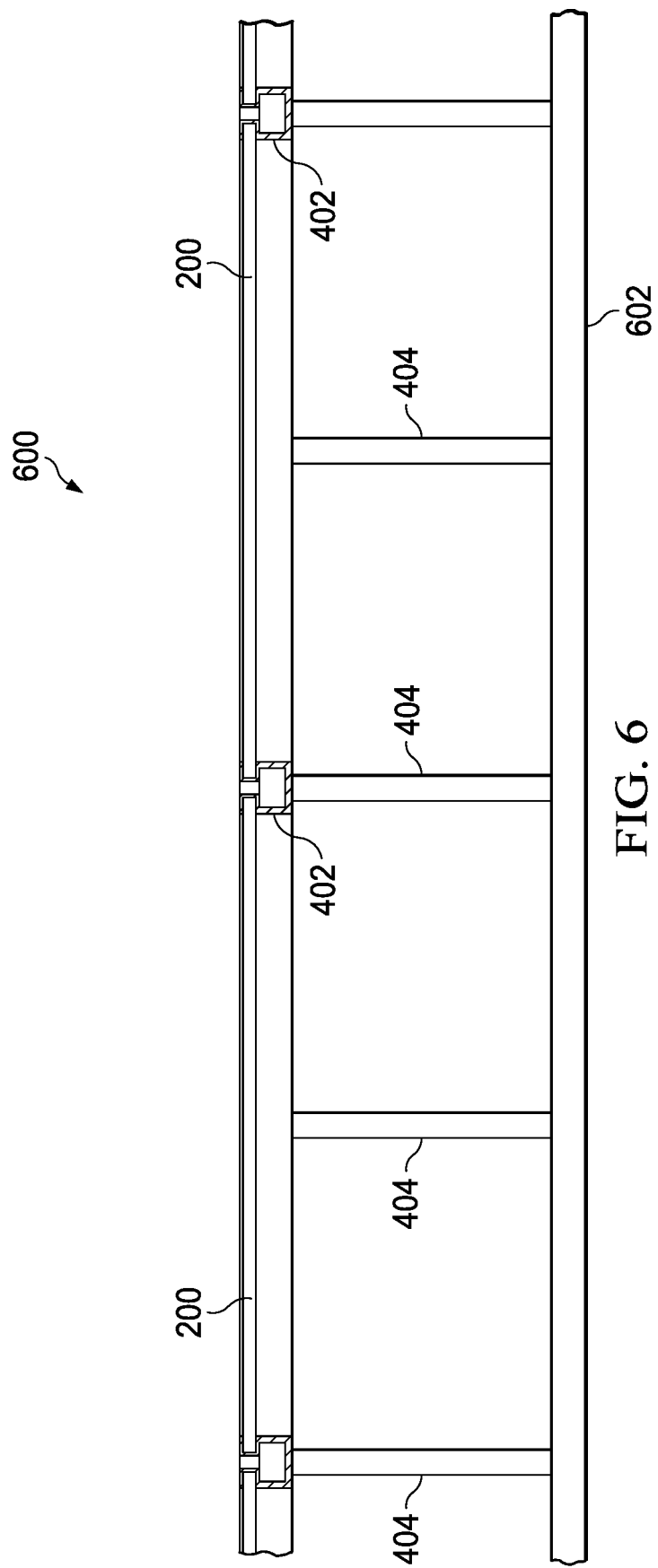
FIG. 6 illustrates a cross-sectional view of one embodiment of the module support structure of FIG. 5.

FIG. 6 illustrates a cross-sectional view of one embodiment of the module support structure of FIG. 5. The cross-section 600 is taken along line 6-6 of FIG. 5 and shows the module support structure 400 attached to the vehicle frame 602. The pucks can be disposed within the mesh members 402 and between struts 404. The pucks are preferably attached with a latch, for ease of reconfiguration. Alternatively, the pucks can be attached to the module support structure 400 via weld, adhesive, mechanical attachment, or other suitable attachment device.

Figure 7:
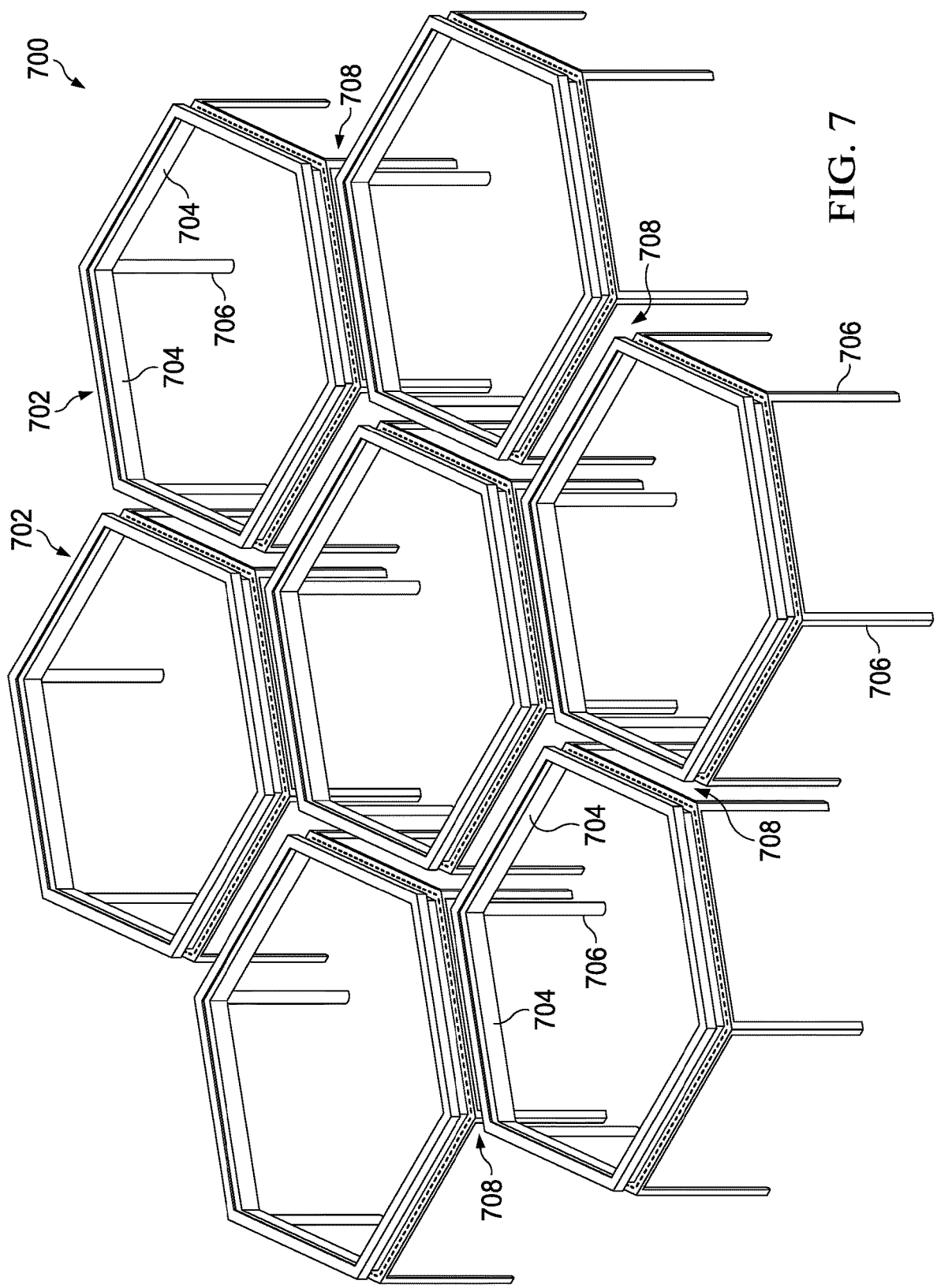
FIG. 7 illustrates a perspective view of an arrangement of standalone puck support structures, in accordance with another embodiment of the present invention.

FIG. 7 illustrates a perspective view of an arrangement 700 of standalone puck support structures 702, in accordance with another embodiment of the present invention. A puck support structure 702 can be formed by a plurality structure members 704 and a plurality of struts 706 extending from one side of the intersection of the members 704. A plurality of puck support structures 702 can be positioned in a honeycomb arrangement on the floor of the vehicles cabin. A floor puck 200 can be disposed within each puck support structure 702. Such puck support structures 702 are positioned such that a channel 708 is created between a first puck support structure and a second puck support structure proximate the first puck support structure. In one exemplary embodiment, bristles can be disposed onto the outer edges of the floor puck 200 to prevent objects from falling into the channel 708, yet still allow for objects to be slid along the channel 708. A plurality of channels 708 are created around each of the floor pucks 200.

Figure 8:
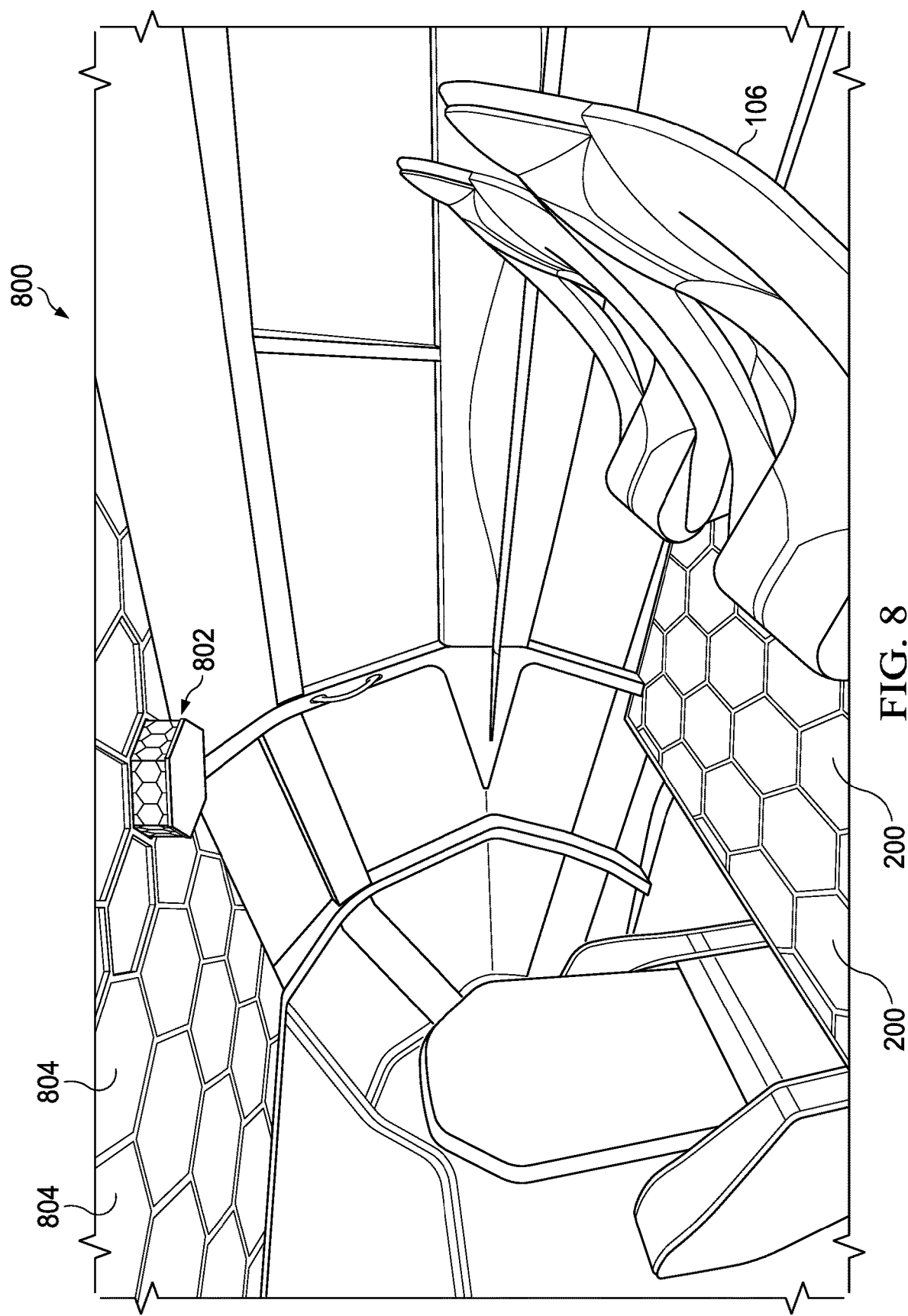
FIG. 8 illustrates an interior view of the vehicle cabin and structural features of the ceiling and floor inside the vehicle cabin, in accordance with one embodiment of the present invention.

FIG. 8 illustrates an interior view of the vehicle cabin and structural features of the ceiling and floor inside the vehicle cabin 800, in accordance with one embodiment of the present invention. In operation, a plurality of ceiling modules are disposed within the module support structure 400 to accommodate the needs of occupants of a vehicle cabin given a particular configuration. Ceiling modules can be fixed in their position to satisfy various regulations associated with the particular vehicle. For example, light ceiling modules 804 can be disposed within the module support structure 400 at specific points that cannot be move. However, in accordance with one embodiment of the present invention, a plurality of light ceiling modules may be repositioned within the cabin where needed.

The light ceiling module 804 can preferably include an array of dimmable, color-changing, light-emitting diodes (LEDs), which can be user adjusted via a touch control panel ceiling module disposed in the module support structure 400. Alternatively, the light ceiling module can include incandescent bulbs or static LEDs. A touch control panel can be deployed out of a ceiling module via a button on the ceiling module that is pushed to extend the control panel down toward a user and then retracted back into place and locked with another push of the button. A vent ceiling module 802 can be disposed within the module support structure 400 to direct air to specific areas of the vehicle cabin. The vent ceiling module may also be deployable as a pop-down module that is activated upon depression.

One or more seats 106 can be moved about the cabin along the channels in the floor system. Each individual seat 106 can be turned to face one another. The seats sliding along the channels in the floor system between the floor pucks 200 when a release button on the seat 106 is depressed and immovably secured when a lock button on the seat 106 is depressed.

Figure 9:
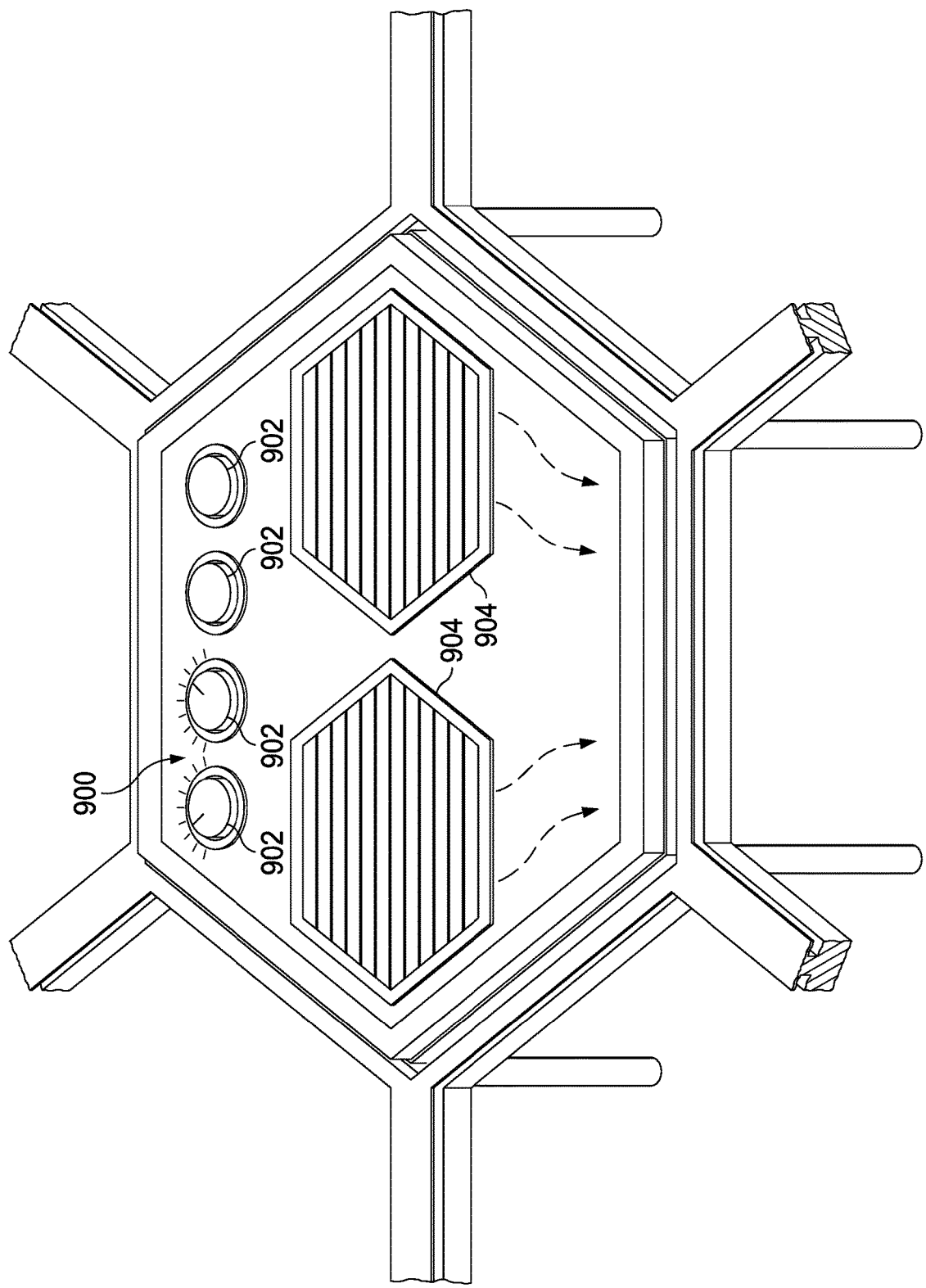
FIG. 9 illustrates a perspective view of a ceiling module having controls and a vent, in accordance with one embodiment of the present invention.

FIG. 9 illustrates a perspective view of a ceiling module having controls and a vent, in accordance with one embodiment of the present invention. A ceiling module 900 can be disposed within the ceiling structure of the present invention. The ceiling module 900 is preferably attached to the module support structure 400 via a keyed latch. The key to such latch is available only to authorized personnel, to prevent to unauthorized repositioning of ceiling modules to different locations for the safety of the occupants. In one embodiment, a ceiling module 900 includes environmental controls 902 sufficient to control environmental aspects, such as temperature and fan speed. Alternatively, the ceiling module 900 can include additional control components to control corresponding mechanisms, such as lighting, speaker volume, and communication elements. The ceiling module 900 can also include one or more vents 904 for expelling conditioned air. The ceiling module 900 can deploy from within the module support structure 400, or retract back into the module support structure 400 via pop-down depression, button depression, voice control, or other suitable means. Each module can receive power via wiring in the module support structure 400. Each module can communicate via wireless communication networks within the vehicle.

Figure 10:
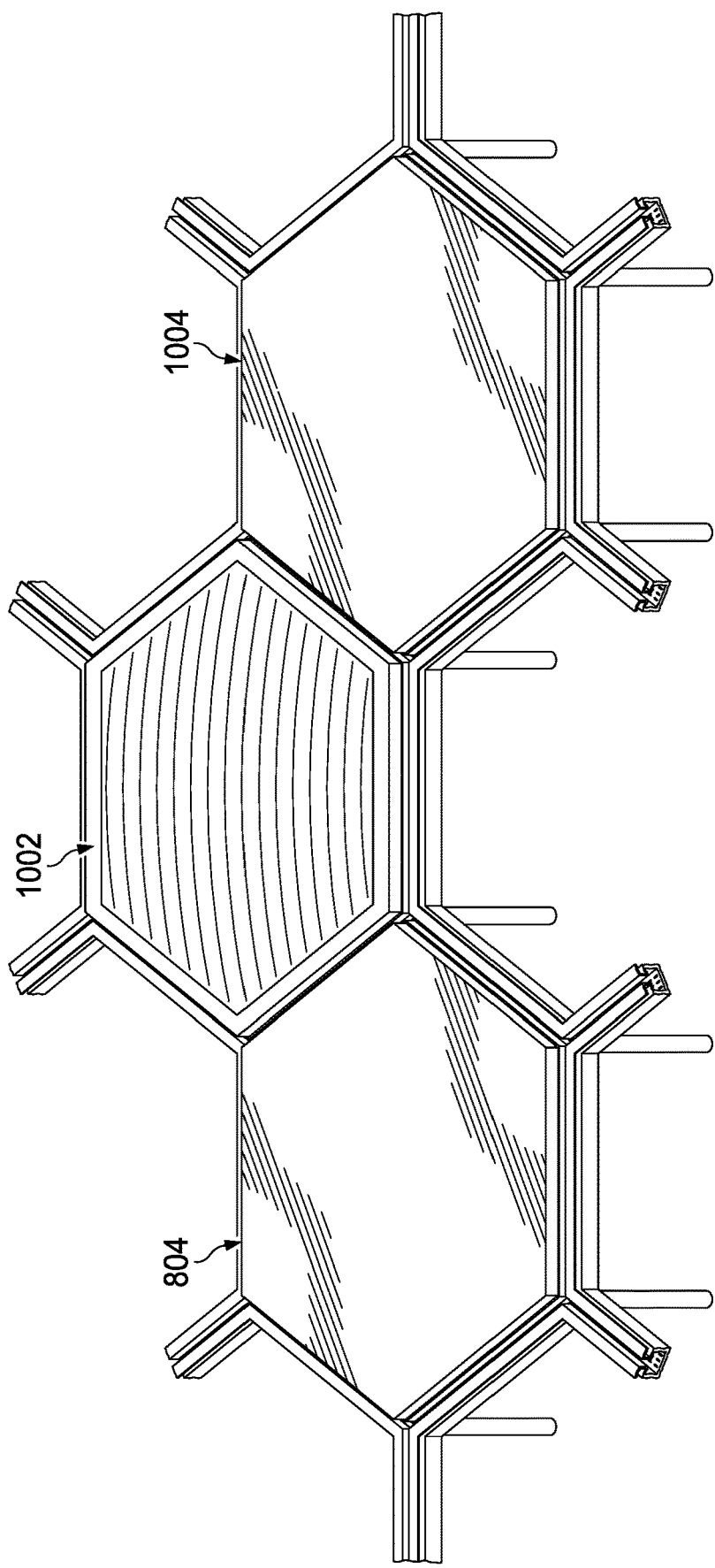
FIG. 10 illustrates a perspective view of a plurality of ceiling modules of different functionality, in accordance with another embodiment of the present invention.

FIG. 10 illustrates a perspective view of a plurality of ceiling modules of different functionality, in accordance with another embodiment of the present invention. Each ceiling module 900 can have the same dimensions despite functionality. The uniformity of dimension allows the customization of a cabin environment, as a ceiling module 900 with a particular function can be plugged into any module support structure 400 hexagonal opening. A light ceiling module 804 can exist next to a vent ceiling module 1002, next to a noise-dampening puck ceiling module 1004. This functionality has the benefit of allowing reduction of power and weight requirements due to removing unneeded ceiling modules 900.

Figure 11:
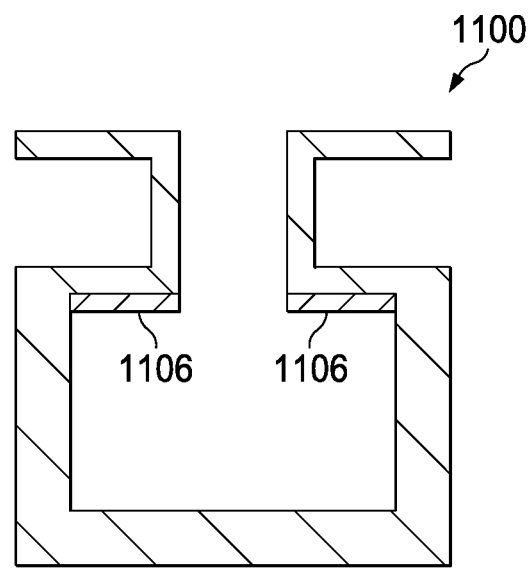
FIG. 11 illustrates a cross-sectional view of a grid attachment mechanism, in accordance with one embodiment of the present invention.

FIG. 11 illustrates a cross-sectional view of a grid attachment mechanism, in accordance with one embodiment of the present invention. Both the module support structure 400 and the puck support structure 702 preferably include a power rail 1106 for powering modules and fixtures attached thereto. In one embodiment, the power rail 1106 can be disposed on the underside of the module support structure 400 and the puck support structure 702, such that an occupant cannot easily contact the power rail 1106. The power rail 1106 can be operably coupled to a battery disposed within the vehicle.

Figure 12:
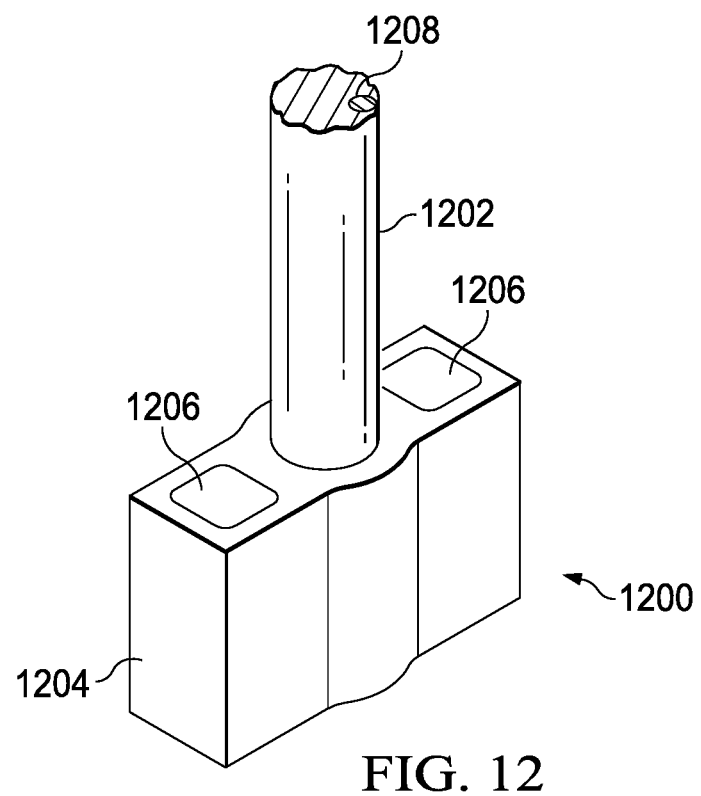
FIG. 12 illustrates a perspective view of a fixture interface, in accordance with one embodiment of the present invention.

FIG. 12 illustrates a perspective view of a fixture interface, in accordance with one embodiment of the present invention. A plurality of fixtures are disposed within the vehicle cabin, such as seats, tables, power consoles, controls, and communication systems. In order to enable customization of the occupant environment, each fixture includes one or more fixture interfaces 1200. Each fixture interface 1200 includes a support member 1202 and a retaining member 1204.

The support member 1202 is a vertical member, such as a bar, rod, lumen, column, or other suitable member, adapted to support and retain a fixture to the floor system. For example, a seat may include one or more support members 1202 for slidably coupling the seat to the floor system. The seat can slide along the channels in the floor system between the floor pucks when a release button on the seat is depressed and become immovably secured when a lock button on the seat is depressed. Each fixture includes a mechanism to rotate the support member 1202, 90 degrees clockwise and 90 degrees counter-clockwise. The rotation mechanism can be a servo motor, or other suitable device. Alternatively, the support member 1202 can be mechanically rotated via a lockable handle on the fixture.

The retaining member 1204 is preferably a rectangular component connected to the support member. The retaining member 1204 is sized to allow insertion into the floor system channel, when in a released position. However, upon 90-degree rotation, the longest length of the retaining member 1204 is rotated perpendicular to the floor system channel, thereby preventing removal of the retaining member 1204 from the floor system channel. The retaining member 1204 includes a power interface 1206, such as a contact pad, or other suitable power interface, adapted to contact the power rail 1106, thereby powering the fixture, when rotated perpendicular to the channel.

The support member 1202 and the retaining member 1204 is preferably a unibody construction. Alternatively, the support member 1202 and the retaining member 1204 can be connected via weld or other suitable connection method. The support member 1202 and the retaining member 1204 are preferably made of metal, but can also be made of a strengthened synthetic material, or other suitable material. When the lock button is depressed, the support member 1202 rotates 90 degrees thereby securing the fixture interface into a locked position. Alternatively, an extension member can extend from the retaining member 1204 to securely compress the retaining member 1204 into place to prevent further movement. Such extension member can be triggered to engage upon contact with the power rail 1106. The extension member can include a servo motor and a piston or other suitable mechanical extension device.

Figure 13:
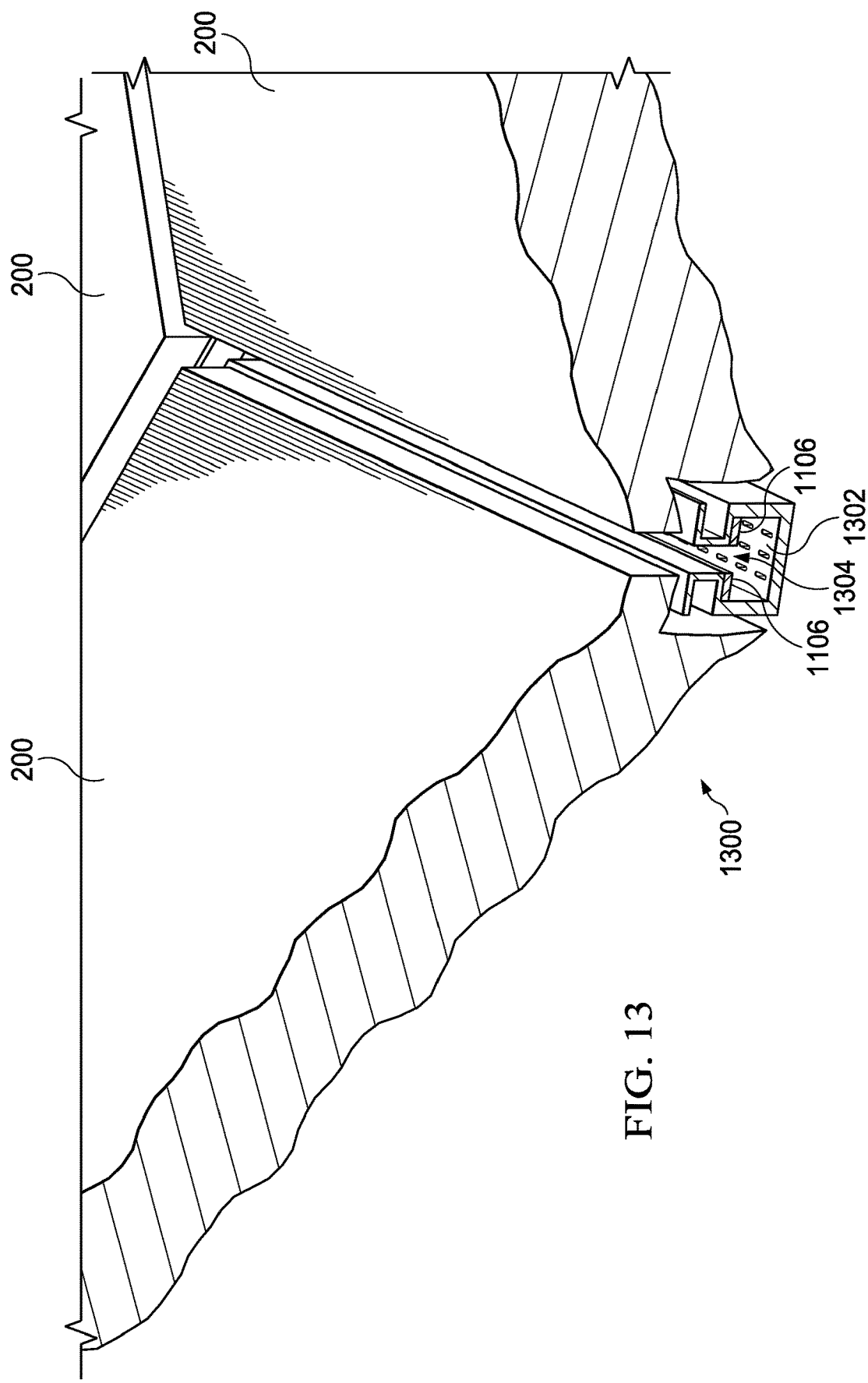
FIG. 13 illustrates a cross-sectional perspective view of the grid attachment mechanism, in accordance with another embodiment of the present invention.

FIG. 13 illustrates a cross-sectional perspective view of a grid attachment mechanism, in accordance with another embodiment of the present invention. Alternatively, a grid attachment mechanism 1300 can be disposed as part of the floor system to retain floor pucks 200. For example, the grid attachment mechanism can include a rectangular tube having a lengthwise opening 1304 along the top side of the rectangular tube. The flanges of the floor pucks 200 can lay on the topside of the grid attachment mechanism 1300, while being held in place by the side walls of the grid attachment mechanism 1300.

A plurality of grid attachment mechanisms 1300 can be positioned to form a honeycomb pattern for the floor pucks 200. Power rails 1106 can be disposed along the top side of the grid attachment mechanism 1300. The bottom side of grid attachment mechanism 1300 can include vents 1302 for allowing air conditioned air to radiate therefrom.

The present invention achieves advantages over the prior art by providing for customized environments within vehicle cabins. Seats, tables, and other fixtures can be easily inserted, moved, and removed from vehicle cabins. Additionally, seats can be rotated to face any direction desired, allowing for a more enjoyable environment for occupants. Support and retaining members allow for securing and powering of fixtures during travel. Lock and release functionality allow for easy manipulation of fixtures along channels in the floor. Ceiling modules provide for increased functionality where positioned and allow for energy savings due to the ability to turn off unwanted or unneeded modules. Also, the ability to remove unwanted fixtures can provide weight savings and increase vehicle efficiency. The instant invention allows for optional interior features that may be provided in the passenger space behind the pilot seat, such as a pair of seats for use by corporate executives including a food service console between the seats, a conference equipment setup with computer displays and keyboards, and an emergency medical facility, among others.

While the present invention has been described in detail, it is not intended to be limited. Accordingly, various changes, variations, and substitutions may be made without departing from the spirit or scope of the invention as disclosed.

What is claimed is:

1. A vehicle cabin, comprising:
    a floor system formed of removable and reconfigurable puck support structures extending from a vehicle frame;
    a ceiling system formed of removable and reconfigurable ceiling segments disposed in the ceiling of the vehicle cabin; and
    a fixture interface having a support member and a retaining member,
    wherein the support member is adapted to retain a fixture to the floor system;
    wherein the puck support structures are positioned to form a floor channel configured to receive the fixture interface; and
    wherein the retaining member is connected to the support member and configured to be inserted into the floor channel;
    wherein each of the puck support structures include a floor puck disposed within the puck support structure.

2. The vehicle cabin of claim 1, wherein the fixture interface is adapted to releasably secure the fixture to the floor system.

3. The vehicle cabin of claim 2, wherein the fixture is operable to slidably reposition within the vehicle along the floor channel.

4. The vehicle cabin of claim 1, wherein one of the ceiling segments includes one or more of a lighting module, a ventilation outlet, a ventilation inlet, a display screen, or a touch control panel.

5. The vehicle cabin of claim 1, wherein the ceiling segments are hexagonal.

* * * * *